May 17, 1932. U. C. TAINTON 1,858,944
HYDROMETALLURGICAL TREATMENT OF ORES
Filed Aug. 20, 1924
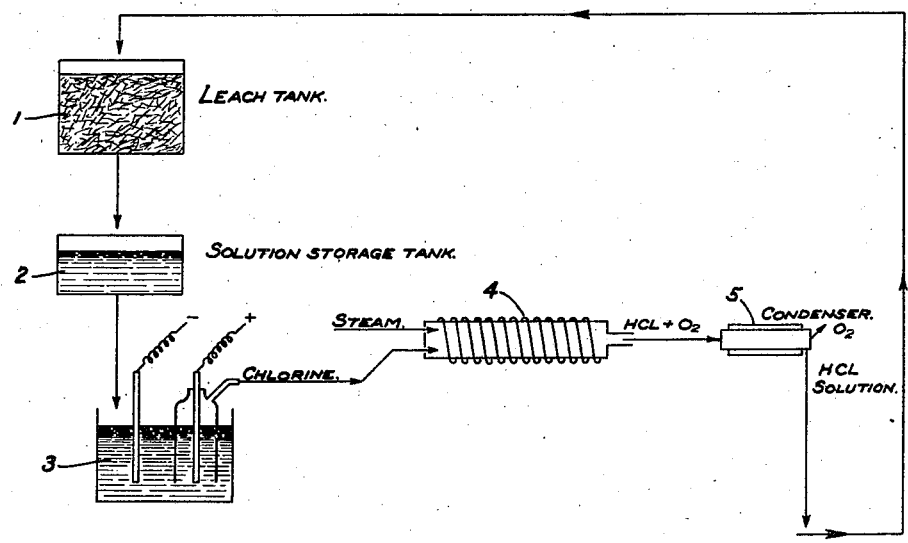
INVENTOR.
Urlyn C. Tainton.
BY
Dewey, Strong, Townsend & Loftus
ATTORNEYS.

Patented May 17, 1932

1,858,944

UNITED STATES PATENT OFFICE

URLYN C. TAINTON, OF JOHANNESBURG, TRANSVAAL, UNION OF SOUTH AFRICA

HYDROMETALLURGICAL TREATMENT OF ORES

Application filed August 20, 1924. Serial No. 733,121.

This invention relates to improvements in the art of extracting metals from ores and is intended especially to provide a simple and inexpensive way of regenerating the solutions when a chloride or mixture of chlorides is used as the solvent.

The figure of the drawing diagrammatically illustrates the case of an oxidized lead ore containing a mixture of lead carbonate and lead sulphate.

It is well known that an acid chloride solution is a good solvent for lead, silver, zinc, copper, etc., from roasted or oxidized ores. In the process of dissolving, however, the metals bring into solution other salts which are often undesirable. For instance, when a lead sulphide ore is roasted, the lead is oxidized to sulphate, and when this roasted ore is leached, say with acid brine, the sulphate radical combines with sodium to give sodium sulphate:

$$2NaCl + PbSO_4 = PbCl_2 + Na_2SO_4$$

Similar reactions occur when the metals are present in other forms:

$$PbCO_3 + 2NaCl = Na_2CO_3 + PbCl_2$$
$$ZnO + 2NaCl + H_2O = ZnCl_2 + 2NaOH$$
$$CuCO_3 + 2NaCl = CuCl_2 + Na_2CO_3$$

The formation of these salts retards the progress of the reaction and, if the process is to be used continuously, means must be found for their elimination.

According to the present invention, this is accomplished by electrolyzing with an insoluble anode the solution obtained from a previous leach. This results in the precipitation of the metal and the formation of gaseous chlorine. This gaseous chlorine is then brought into contact with an oxide or carbonate, under proper conditions of temperature, presence of catalyst, etc. The chlorine then combines with the base of this oxide or carbonate to form a chloride with liberation of oxygen or carbon-dioxide. The chloride thus formed may be used directly in the leaching operation to eliminate the undesirable salts above mentioned.

As an illustration, take the case of a roasted ore containing lead sulphate as above mentioned. On leaching with brine, we have, $$PbSO_4 + 2NaCl = PbCl_2 + Na_2SO_4$$

Electrolyzing this solution results in the deposition of lead and the evolution of chlorine: $PbCl_2$ electrolyzed yields $Pb + Cl_2$. The chlorine is then caused to combine with a suitable oxide or carbonate with evolution of oxygen or carbon-dioxide:

$$2CaO + 2Cl_2 = 2CaCl_2 + O_2$$
$$2CaCO_3 + 2Cl_2 = 2CaCl_2 + 2CO_2 + O_2$$

This reaction may be expedited by heat and certain catalysts, notably the presence of cobalt and nickel compounds.

The calcium chloride formed in the above reaction may be added to the next leach to prevent the formation of the sodium sulphate formed in the first reaction, $$PbSO_4 + CaCl_2 + NaCl = PbCl_2 + CaSO_4 + NaCl$$

thus giving a cyclic process, since the calcium sulphate is insoluble and is thus removed from solution.

Where a carbonate or oxide ore is to be treated, the chlorine may be made to combine with the hydrogen of water, giving hydrochloric acid and oxygen.

$$2H_2O + 2Cl_2 = 4HCl + O_2$$

This is done by first heating and then rapidly cooling a mixture of steam and gaseous chloride. A convenient way is to pass the mixture first through a hot and then a cold tube of fused silica or similar material.

The condensed hydrochloric acid may then be added to the leach to prevent the formation of the sodium carbonate above mentioned. Thus we have, PbCl$_2$ electrolyzed yields Pb and Cl$_2$
$$2Cl_2 + 2H_2O = 4HCl + O_2$$
$$2HCl + PbCO_3 = PbCl_2 + H_2O + CO_2$$

thus giving a cyclic process.

In certain cases, the oxides or carbonates in the ore itself may be made to combine with the chlorine to yield oxygen and chlorides. For example by bringing chlorine into contact with an ore containing zinc oxide at elevated temperature, the following reaction occurs—

$$ZnO + Cl_2 = ZnCl_2 + \tfrac{1}{2}O_2$$

Similar reactions occur with the other metallic oxides at proper temperatures.

In the case of a sulphide ore, the ore may be first roasted to form oxides, and then while still hot brought into contact with the gaseous chlorine thus:

$$2ZnS + 3O_2 = 2SO_2 + 2ZnO$$
$$2ZnO + 2Cl_2 = 2ZnCl_2 + O_2$$

Other metals besides zinc, notably silver and copper, may be effectively chloridized in this way.

As a specific example of the mode of application of this invention, the treatment of electrolytic zinc plant residues will be described. These residues represent the material remaining after the roasted zinc concentrates have been leached with sulphuric acid to dissolve the zinc and copper, and contain usually substantial quantities of lead, silver and copper. Although this lead is oxidized, i. e. present mainly in sulphate form, I find it is of advantage to first heat it to a temperature around above 400° C. preferably with the admixture of a small quantity, say 2% of common salt or other chloride. The effect of this is to cause the basic ferric sulphate always present in these residues to break down liberating sulphuric acid and this acid then reacts with the sodium chloride yielding sodium sulphate and hydrochloric acid which in turn chloridizes the silver minerals. Alternatively instead of the addition of salt, a small quantity of chlorine derived from the subsequent electrolysis may be led into the chamber in which the ore is being heated. This chlorine will react with the metallic oxides present (such as zinc oxide) forming chlorides and liberating free oxygen as previously described.

The calcined material is now preferably washed with water to remove the soluble salts formed in the above reactions. After separation of the solution so formed (from which the valuable constituents such as zinc and copper may be precipitated by any suitable means such as the addition of lime) the material is mixed with a solution of sodium and calcium chlorides preferably containing a little free acid and dissolved chlorine.

The lead, silver and gold then dissolve in the solution which is separated from the now barren residue by filtration or settlement. The solution may then be precipitated electrolytically preferably by means of the electrolytic cell described in prior patents of the present applicant. In this way the gold, silver and copper and precipitated and gaseous chlorine are set free, part of which may be used to impregnate the barren solution for use in another leaching cycle. The rest of the chlorine may be passed into an emulsion of milk of lime to which a small quantity of crude nickel sulphate is added. The chlorine combines with the calcium forming calcium chloride, and liberating oxygen and the solution of calcium chloride is then mixed with the precipitated solution which is returned to the leaching plant to be used in dissolving the values from a fresh batch of ore.

To give a specific description in the case of an oxidized lead ore containing a mixture of lead carbonate and lead sulphate, reference is made to the diagram flow sheet illustrated on the figure of the drawing. The ore is leached in a tank indicated at 1, and after leaching this solution is conveyed to a storage tank indicated at 2. From there the solution is delivered to an electrolytic cell indicated at 3. The lead is here deposited at the cathode and chlorine gas is evolved at an insoluble anode. The discharging chlorine gas may be treated in one of two ways. For example, it may be delivered to a hot tube 4 where it reacts with steam under suitable reaction conditions to form hydrochloric acid gas and oxygen. Such gases are delivered to a condenser indicated at 5 where the hydrochloric acid gas is dissolved in the condensing excess steam and the oxygen is permitted to escape, or it may be used as desired. Or, the chlorine gas may be delivered to a suitable reaction vessel 6, such as a hot revolving kiln, where it comes in contact with and reacts with crushed limestone to be converted into calcium chloride, the resulting carbon dioxide and oxygen being permitted to escape, or they may be used as desired. The calcium chloride so formed is delivered to a tank indicated at 7 where it may be dissolved. Either the hydrochloric acid solution or the calcium chloride solution (or both) formed as described above may be used for leaching a fresh batch.

Having thus described my invention, what I claim and desire to secure by Letters Patent is—

1. A process for the recovery of metals from oxidized or roasted ores, which consists in leaching such material with a chloride solution to form a metallic chloride, electrolyzing the solution with an insoluble anode to precipitate the metal and set free the chlorine, causing such chlorine to react with a reagent capable of forming therewith oxygen and a chloride free of sulphate and carbonate, dissolving the thus formed chloride in water to form a leaching solution free of sulphate and carbonate, and leaching a fresh lot of ore with such solution.

2. A process for the recovery of metals from oxidized or roasted ores, which consists in leaching such material with a chloride solution to form a metallic chloride, electrolyzing the solution with an insoluble anode to precipitate the metal and set free the chlorine, causing such chlorine to react with a compound of an alkali earth metal capable of forming oxygen and the corresponding alkali earth metal chloride free of sulphate and carbonate, dissolving the thus formed alkali earth metal chloride in water to form a leaching solution free of sulphate and carbonate, and leaching a fresh lot of ore with such solution.

3. A process for the recovery of metals from oxidized or roasted ores, which consists in leaching such material with a chloride solution to form a metallic chloride, electrolyzing the solution with an insoluble anode to precipitate the metal and set free chlorine, causing such chlorine to react with a compound containing at least calcium and oxygen to form oxygen and calcium chloride free of sulphate and carbonate, dissolving the thus formed calcium chloride in water to form a leaching solution free of sulphate and carbonate, and leaching a fresh lot of ore with such solution.

URLYN C. TAINTON.